(12) United States Patent
Inda et al.

(10) Patent No.: US 7,306,879 B2
(45) Date of Patent: Dec. 11, 2007

(54) LITHIUM ION SECONDARY CELL

(75) Inventors: Yasushi Inda, Sagamihara (JP); Kazuo Ohara, Yokohama (JP); Tetsuo Uchiyama, Koganei (JP); Morinobu Endo, Suzaka (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 489 days.

(21) Appl. No.: 10/445,742

(22) Filed: May 27, 2003

(65) Prior Publication Data

US 2003/0224244 A1    Dec. 4, 2003

(30) Foreign Application Priority Data

May 30, 2002   (JP)   ............... 2002-157134

(51) Int. Cl.
*H01M 4/62*   (2006.01)
(52) U.S. Cl. ...................... 429/126; 429/232
(58) Field of Classification Search ............... 429/232, 429/126, 302, 209, 231.8
See application file for complete search history.

(56) References Cited

U.S. PATENT DOCUMENTS

| | | | | |
|---|---|---|---|---|
| 5,387,479 A | * | 2/1995 | Koksbang | 429/126 |
| 5,503,946 A | * | 4/1996 | Fauteux et al. | 429/50 |
| 6,090,506 A | * | 7/2000 | Inoue et al. | 429/232 |
| 6,306,509 B2 | * | 10/2001 | Takeuchi et al. | 428/425.8 |
| 2001/0011119 A1 | | 8/2001 | Shuichi et al. | |
| 2002/0045091 A1 | | 4/2002 | Toshikazu et al. | |

FOREIGN PATENT DOCUMENTS

EP    0811479 A    12/1997

* cited by examiner

*Primary Examiner*—Tracy Dove
(74) *Attorney, Agent, or Firm*—Hedman & Costigan P.C.; James V. Costigan

(57) ABSTRACT

A lithium ion secondary cell comprises a positive electrode, a negative electrode, a solid electrolyte and a fiber layer provided in an interface between the solid electrolyte and the positive electrode and/or in an interface between the solid electrolyte and the negative electrode.

7 Claims, 1 Drawing Sheet

LITHIUM ION SECONDARY CELL

BACKGROUND OF THE INVENTION

This invention relates to a lithium ion secondary cell employing a solid electrolyte.

In the past, a non-aqueous electrolytic solution was generally used as an electrolytic solution for a lithium ion secondary cell. A lithium ion secondary cell employing a polymer electrolyte made of polymer has recently attracted more attention of the industry than such electrolytic solution mainly employing liquid.

The lithium ion secondary cell employing a polymer electrolyte holds a liquid electrolytic solution in the polymer electrolyte and, therefore, has the advantages that there is little possibility of leakage of the liquid, that there is little possibility of corrosion, that short-circuiting between electrodes caused by precipitation of lithium in the form of dendrite can be prevented and that assembly of the cell is easy because the structure of the cell is very simple.

Since lithium ion conductivity of such polymer electrolyte is lower than an electrolyte containing only an electrolytic solution, there has occurred a practice to reduce thickness of the polymer electrolyte. There, however, has arisen a problem in such polymer electrolyte whose thickness is reduced that, since its mechanical strength is reduced, the polymer electrolyte tends to be destroyed resulting in short-circuiting between the positive electrode and the negative electrode.

To solve the above problem and improve mechanical strength of the electrolyte, Japanese Patent Application Laid-open Publication No. 6-140052 proposes a composite electrolyte made by adding an inorganic oxide such as alumina to an electrolyte in the form of gel. The publications also proposes inorganic oxides other than alumina, such as silica and lithium aluminate, as a preferable adder.

If, however, an inorganic oxide such as alumina is added to an electrolyte, there arises the problem that lithium ion conductivity of the composite electrolyte is significantly reduced. Besides, if charging and discharging are performed repeatedly in a lithium ion secondary cell containing this composite electrolyte, reaction takes places between the electrolyte and the inorganic oxide to deteriorate the charging-discharging cycle characteristic of the lithium ion secondary cell.

There have also been proposed various solid electrolyte cells which do not employ an electrolytic solution at all for the sake of safety. Since, however, the positive and negative electrodes and electrolyte composing the cell are all made of solid materials, electro-chemical resistance in the interface between the positive electrode and the electrolyte or between the negative electrode and the electrolyte is very high. For this reason, impedance in the interface is so large that polarization tends to take place. This makes it difficult to realize a cell of a high capacity and a large power.

It is, therefore, an object of the present invention to provide a lithium ion secondary cell which has solved the above problems and has a small interface resistance notwithstanding that a solid electrolyte is employed and, therefore, has a high cell capacity and an excellent charging-discharging cycle characteristic and thereby ensures a stabilized use over a long period of time.

SUMMARY OF THE INVENTION

As a result of detailed studies and experiments, the inventors of the present invention have found, which has led to the present invention, that, by forming a layer of fine fibers in an interface of a solid electrolyte and a positive electrode or in the interface of a solid electrolyte and a negative electrode, an excellent electro-chemical connection is realized in the interface and a lithium ion secondary cell which utilizes it has a higher output capacity and a better charging-discharging cycle characteristic than the conventional solid electrolyte type cell.

A lithium ion secondary cell of the present invention comprises a positive electrode, a negative electrode, a solid electrolyte and a fiber layer provided in an interface between the solid electrolyte and the positive electrode and/or in an interface between the solid electrolyte and the negative electrode.

By forming the fiber layer in the interface between the solid electrolyte and the positive electrode and/or in the interface between the solid electrolyte and the negative electrode, the lithium ion secondary cell according to the invention can have an excellent electro-chemical connection in the interface. Besides, by contact of the fiber layer with an active material of the electrodes, internal resistance of the active material is reduced and a carbon fiber of the fiber layer absorbs and stores lithium and the carbon fiber layer assists the active material. Further, since a fine carbon fiber has a high liquid retention capacity, the carbon fiber can be impregnated with a non-aqueous organic electrolytic solution used in the conventional lithium ion secondary cells. Thus, the lithium ion secondary cell of the present invention has a high output capacity and an improved charging-discharging cycle characteristic and, besides, has a high safety without the risk of leakage of liquid as in the conventional cells because it has a high liquid retention capacity.

In the lithium ion secondary cell of the present invention, it is preferable for the fiber layer to be impregnated with organic liquid. In case the cell is impregnated with organic liquid, the liquid retention capacity of the surface of the solid electrolyte is improved and, therefore, strength of electro-chemical connection between the solid electrolyte and the electrodes becomes large and the lithium ion secondary cell of the present invention which uses it can have a reduced interface resistance. As the organic liquid used for this purpose, an organic electrolytic solution can be employed. In case a composite electrolyte is used as the solid electrolyte, an organic electrolytic solution impregnated in the composite electrolyte may be commonly impregnated in the fiber layer.

In the lithium ion secondary cell of the present invention, the positive electrode should preferably be disposed adjacent to the solid electrolyte through the fiber layer without being in direct contact with the solid electrolyte. The negative electrode also should preferably be disposed adjacent to the solid electrolyte through the fiber layer without being in direct contact with the solid electrolyte.

As the fiber used in the lithium ion secondary cell of the present invention, a carbon fiber having a diameter of 0.5 nm to 1000 nm may be used. By milling the carbon fiber, interface resistance is reduced due to increase in the area of contact to the solid electrolyte and active material and the capacity is increased due to increase in the area of absorbing lithium.

In the lithium ion secondary cell of the present invention, the solid electrolyte should preferably have a textured surface which is in contact with the fiber layer. By this arrangement, specific surface area of the solid electrolyte surface increases which in turn increases the strength of connection with the fiber layer formed in the interface with the positive or negative electrode.

In the lithium ion secondary cell of the present invention, the solid electrolyte should preferably comprise lithium ion conductive crystal or glass. The thinner the solid electrolyte used in the lithium ion secondary cell of the present invention, the shorter becomes the distance of movement of lithium ion resulting in achievement of a cell having a higher output, and the broader becomes the area of the electrode per unit volume resulting in achievement of a cell having a high capacity. For this reason, the thickness of the solid electrolyte of the lithium ion secondary cell of the present invention should preferably be 300 μm or below.

Mobility of lithium ion during charging and discharging in the lithium ion secondary cell of the present invention depends upon lithium ion conductivity and lithium ion transport number of the solid electrolyte. The solid electrolyte therefore should preferably have ion conductivity of $1\times10^{-5}$ S·cm$^{-1}$ or over and, more preferably, $1\times10^{-4}$ S·cm$^{-1}$. or over.

The solid electrolyte may be made of a lithium ion conductive glass-ceramic or a composite electrolyte of a lithium ion conductive glass-ceramic and a polymer.

BRIEF DESCRIPTION OF THE DRAWINGS

In the accompanying drawings.

DESCRIPTION OF PREFERRED EMBODIMENTS OF THE INVENTION

Figure 1:
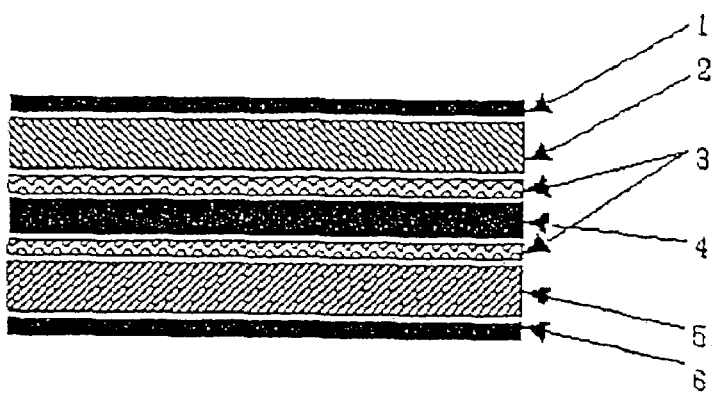
FIG. 1 is a schematic sectional view showing an internal structure of the lithium ion secondary cell of Examples 1 and 2.

In a preferred embodiment of the invention, the solid electrolyte of the lithium ion secondary cell may be made of a glass-ceramic provided by heat treating and thereby crystallizing a $Li_2O$—$Al_2O_3$—$TiO_2$—$SiO_2$—$P_2O_5$ base glass and having, as a predominant crystal phase, $Li_{1-x+y}Al_xTi_{2-x}Si_yP_{3-y}O_{12}$ ($0 \leq x \leq 1$, $0 \leq y \leq 1$, preferably $0 \leq x \leq 0.4$, $0 \leq y \leq 0.6$)

In another preferred embodiment of the invention, the solid electrolyte may be a composite electrolyte of a lithium ion conductive glass-ceramic and a polymer. The polymer which constitutes the composite electrolyte can increase the cell capacity per volume when it is used in a cell and has flexibility which enables the cell to be formed in various shapes and, therefore, it may preferably be shaped to a sheet when it is combined with glass-ceramic.

As a polymer material for constituting the composite electrolyte may be used polymers including, for example, polyethyleneoxide, polyethylene, polypropylene, polyolefin, fluorine-containing resin such as polytetrafluoroethylene, polychlorotrifluoroethylene and polyvinylidene fluoride, polyamides, polyesters and polyacrylates, and polymer materials containing such polymers as a structural unit. A polymer material imparted with lithium ion conductivity by adding a lithium salt thereto may more preferably be used for increasing lithium ion conductivity of the composite electrolyte.

In the lithium ion secondary cell of the present invention, the advantage obtained by forming the fiber layer in the interface of the solid electrolyte is great not only in the case where the solid electrolyte is a fully solid electrolyte such as one made of glass-ceramic but also in the case where the solid electrolyte is a solid electrolyte having flexibility to some extent such as a composite electrolyte made of glass-ceramic and a polymer.

As the composite electrolyte constituting the solid electrolyte of the lithium ion secondary cell of the present invention may be used a composite electrolyte which is a composite of glass-ceramic powder and a polymer material having ion conductivity of $1\times10^{-5}$ S·cm$^{-1}$ or over.

As the lithium ion conductive glass-ceramic powder having a high lithium ion conductivity contained in the composite electrolyte may be used one obtained by crushing the above described lithium ion conductive glass-ceramic.

In the lithium ion secondary cell of the present invention, the positive electrode may be made by forming a material containing a transition metal oxide as a positive electrode active material on an aluminum foil used as a positive electrode collector. The positive electrode may also be made by mixing a positive electrode active material, an electric conductor and a binder, coating the mixture on a positive electrode collector by casting and drying it to a sheet-like electrode.

As the positive electrode active material, a transition metal compound capable of absorbing and storing and discharging lithium may be used. For instance, an oxide or oxides containing at least one transition metal selected from manganese, cobalt, iron, nickel, vanadium, niobium, molybdenum, titanium etc. may be used. In a case where a material which does not contain lithium is used for a negative electrode active material, a transition metal oxide containing lithium may preferably be used as the positive electrode active material. As the electric conductor, electrically conductive materials such as acetylene black, Ketjen black and carbon black may be used. As the binder, fluorine-containing resins such as polyvinylidene fluoride and other thermoplastic resins and organic materials such as a polymer having rubber elasticity may be used.

The negative electrode of the lithium ion secondary cell of the present invention may be made by forming a material containing a negative electrode active material on a cupper foil used as a negative electrode collector. Alternatively, the negative electrode may be made by mixing a negative electrode active material and a binder in an organic liquid or mixing a mixture of a binder and an organic liquid with a negative electrode active material, coating the mixture on a negative electrode collector by casting, and drying it to a sheet-like electrode. As the negative electrode active material, a metal or alloy capable of absorbing and storing and discharging lithium such as metal lithium, a lithium-aluminum alloy and a lithium-indium alloy, transition metals such as titan and vanadium, and carbonic materials such as graphite, active carbon and mesophase pitch carbon fiber may be used.

The fiber layer formed in the interface between the positive electrode and the solid electrolyte or between the negative electrode and the solid electrolyte is provided as a buffer layer for increasing contact between the respective electrodes and the solid electrolyte. Since a sufficient area of contact cannot be obtained when two solids are in contact with each other, the interface between the solids becomes a significant resistance layer. By inserting a fine carbon fiber layer in the interface for the purpose of increasing the area of contact, this resistance can be reduced. This carbon fiber layer may be obtained by dispersing carbon fiber in an organic liquid such as propylene carbonate, coating this mixture on the electrode and drying it. Alternatively, the carbon fiber layer may be obtained by dispersing carbon fiber in an organic liquid and printing the mixture on the electrode. Alternatively further, the carbon fiber layer may be obtained by forming the mixture to a sheet in the manner of making paper and attaching the sheet on the electrode. In this case, existence of fibers disposed perpendicularly to the surfaces of the sheet is preferable because adhesion to the electrode and electrolyte is improved. Since a thinner fiber layer results in smaller resistance in moving of electric charges, the carbon fiber layer should preferably have a thickness of 20 µm or below and, more preferably, 10 µm or below. By impregnating the carbon fiber layer with an organic electrolytic solution as used in the conventional lithium ion secondary cells, contact resistance in the interface can be significantly reduced.

The fiber layer also improves adhesion strength and thereby prevents separation of the electrode and occurrence of cracks in the electrode due to change in the volume of the electrode during charging and discharging of the cell and thermal expansion of the electrode caused by change in the temperature. Thus, a lithium ion secondary cell of a high efficiency and long life can be realized.

As the carbon fiber, a fibrous carbon having a diameter of 0.5 nm to 1000 nm, preferably 1.0 nm to 200 nm, made by the arc method, the laser abrasion method or the gas phase growth method may be used. As a solute which constitutes the organic electrolytic solution with which the carbon fiber layer is impregnated, lithium salts such as $LiPF_6$, $LiBF_4$, $LiClO_4$, $LiI$, $LiAsF_6$, $LiCF_3SO_3$, $Li(CF_3SO_2)_2N$ and $LiC_4F_9SO_3$ may be used as an electrolyte. As a solvent, a mixture of a high boiling-point solvent selected from, e.g., ethylene carbonate, propylene carbonate, butylene carbonate and γ-butyrolactone and a low boiling-point solvent selected from, e.g., 1,2-dimethoxyethane, methyl formate, methyl acetate, methyl propionate, dimethyl carbonate, ethyl methyl carbonate and diethyl carbonate may be used.

EXAMPLES

Specific examples of the lithium ion conductive secondary cell of the present invention will be described below. It will also be described with reference to comparative examples that the lithium ion secondary cell of the present invention having the carbon fiber layer between the solid electrolyte and the positive and negative electrodes is superior to the cells of these comparative examples. It should be noted that the invention is not limited to these examples but various modifications can be made within the scope and spirit of the invention.

Example 1

Preparation of Lithium Ion Conductive Glass-Ceramic

For achieving precipitation of the crystal of $Li_{1-x+y}Al_xTi_{2-x}Si_yP_{3-y}O_{12}$ (0≦x≦0.4, 0≦y≦0.6). raw materials of $P_2O_5$, $Al_2O_3$, $Li_2CO_3$, $SiO_2$ and $TiO_2$ were mixed and melted and the melt was expanded by stainless steel rollers to provide a base glass. The base glass was heat treated to provide the target lithium ion conductive glass-ceramic (i.e., solid electrolyte). It was confirmed by the powder X-ray diffraction method that this glass-ceramic contained as its predominant crystal phase $Li_{1-x+y}Al_xTi_{2-x}Si_yP_{3-y}O_{12}$. As a result of impedance measurement of this glass-ceramic, ion conductivity of this glass-ceramic at room temperature (25° C.) was $1.4 \times 10^{-3} S \cdot cm^{-1}$.

Preparation of the Positive Electrode

Commercially available lithium cobaltite ($LiCoO_2$) having an average grain diameter of 5 µm used as the positive electrode material (positive electrode active material), acetylene black used as the electric conductor and polyvinylidene fluoride used as the binder were mixed at a ratio in mass of 82:10:8 by using an acetone solvent. The mixture was coated on a positive electrode collector made of an aluminum sheet having a thickness of 10 µm by casting to a thickness of about 80 µm and then was dried to form a sheet-like positive electrode.

Preparation of the Negative Electrode

Commercially available graphite powder having an average grain diameter of 10 µm used as the negative electrode material (negative electrode active material) was mixed with polyvinylidene fluoride used as the binder at a ratio in mass of 92:8 by using an acetone solvent. The mixture was coated on a negative electrode collector made of a cupper foil having a thickness of 10 µm by casting to a thickness of about 50 µm and then was dried to form a sheet-like negative electrode.

Preparation of Organic Electrolytic Solution

The organic electrolytic solution was prepared by dissolving $LiBF_4$ at a concentration of 1 mol/L in a solvent prepared by mixing ethylene carbonate with dimethyl carbonate at a ratio in mass of 50:50.

Preparation of the Fiber Layer

Carbon fibers each having a diameter of about 150 nm and a length of about 10 µm were dispersed by ultrasonic dispersion in propylene carbonate. This carbon fiber dispersed solution was coated on the active material surfaces of the positive and negative electrodes prepared in the above described manner and then was dried in vacuum to form a fiber layer having a thickness of about 10 µm.

Assembling of the Cell

The lithium ion conductive glass-ceramic was cut out and both surfaces thereof were subjected to a texturing process by grinding the surfaces with grains of #1500. The lithium ion conductive glass-ceramic was placed between the positive and negative electrodes formed respectively with the fiber layer as described above in such a manner that the textured surfaces of the glass-ceramic came into contact with the fiber layers coated on the positive and negative electrodes. The glass-ceramic and the electrodes were then pressed together to adhere to each other. The assembly was soaked in the organic electrolytic solution prepared in the above described manner for ten minutes to have the carbon fiber layer impregnated with the electrolytic solution prepared in the above described manner. Thus, the lithium ion secondary cell shown in FIG. 1 was assembled. In FIG. 1, reference characters 1 designates the positive electrode collector, 2 the positive electrode, 3 the fiber layer, 4 the solid electrolyte, 5 the negative electrode, and 6 the negative electrode collector. Lead lines were connected to the positive and negative electrode collectors 1 and 6 and the charging-discharging cycle test was conducted with a constant current at 30° C. In the charging-discharging test, the discharging capacity cycle characteristic was measured with charging finish voltage of 4.2V, discharging finish voltage of 3.0V and charging-discharging current density of 1 $mA/cm^2$.

Comparative Example 1

A lithium ion secondary cell was assembled in the same manner as in Example 1 excepting that the fiber layer was not provided. The charging-discharging cycle test was conducted under the same condition as in Example 1.

Discharging capacity of Example 1 and Comparative Example 1 at the 1st, 50th and 300th cycles are shown in Table 1.

TABLE 1

| | Discharging capacity (mAh/cm$^2$) | | |
|---|---|---|---|
| | 1st cycle | 50th cycle | 300th cycle |
| Example 1 | 2.9 | 2.7 | 2.2 |
| Comparative Example 1 | 2.4 | 1.9 | 0.8 |

As will be apparent from Table 1, the lithium ion secondary cell of Example 1 has a larger capacity than Comparative Example 1 which is not provided with the fiber layer. Besides, the lithium ion secondary cell of Example 1 is subject to relatively small deterioration with increase in the charging-discharging cycle, exhibiting an excellent cell performance.

Example 2

Preparation of the Composite Electrolyte Comprising Lithium Ion Conductive Glass-Ceramic Powder of crushed glass-ceramic was mixed with polyethyleneoxide added with Li(CF$_3$SO$_2$)$_2$N and the mixture was pressed to expand and then was dried in vacuum to provide a composite electrolyte (solid electrolyte) having a thickness of 30 μm. As a result of impedance measurement of this composite electrolyte, ion conductivity of this composite electrolyte at room temperature (25° C.) was $1.6 \times 10^{-4}$ S·cm$^{-1}$.

Preparation of the Positive and Negative Electrodes and Organic Electrolytic Solution The positive and negative electrodes as well as the organic electrolytic solution were prepared in the same manner as in Example 1.

Preparation of the Fiber Layer

The active material surfaces of the positive and negative electrodes were formed with the fiber layers in the same manner as in Example 1.

Assembling of the Cell

The composite electrolyte was cut out and placed between the positive electrode and the negative electrode formed respectively with the fiber layer in such a manner that layers of the positive electrode/fiber layer/composite electrolyte/fiber layer/negative electrode would be formed. These layers were adhered together by a double roller laminator and then were soaked in the organic electrolytic solution prepared in the same manner as in Example 1 for ten minutes to have the carbon fiber layers impregnated with the electrolytic solution. Thus, a cell having the structure shown in FIG. 1 was obtained. Lead wires were connected to the collectors of the positive and negative electrodes and the charging-discharging cycle test was conducted with constant current at 30° C. In this test, the charging capacity of the cell was measured with charging finish voltage of 4.2V, discharging finish voltage of 3.0V and charging-discharging current density of 1 mA/cm$^2$ Comparative Example 2

A lithium ion secondary cell was assembled in the same manner as in Example 2 excepting that the fiber layers were not formed. The charging-discharging cycle test was conducted under the same conditions as in Example 2.

Discharging capacity of Example 2 and Comparative Example 2 at the 1st, 50th and 300th cycles are shown in Table 2. Change in discharging capacity accompanying the charging-discharging cycle of the respective cells is shown in FIG. 2.

TABLE 2

| | Discharging capacity (mAh/cm$^2$) | | |
|---|---|---|---|
| | 1st cycle | 50th cycle | 300th cycle |
| Example 2 | 3.2 | 3.1 | 2.7 |
| Comparative Example 2 | 2.8 | 2.4 | 1.8 |

Figure 2:
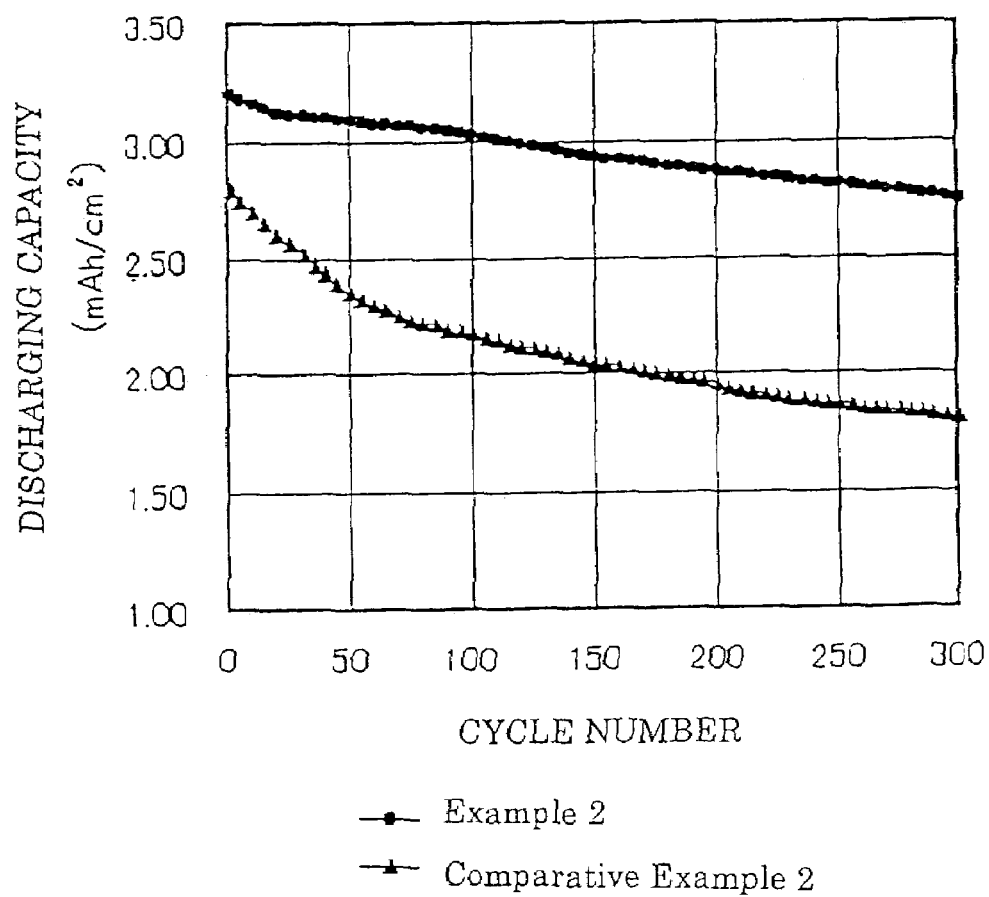
FIG. 2 is a graph showing change in the discharging capacity accompanying the charging-discharging cycles of the lithium ion secondary cells of Example 2 and Comparative Example 2.

As will be apparent from Table 2 and FIG. 2, the lithium ion secondary cell of Example 2 has a larger capacity than Comparative Example 2 which is not provided with the fiber layer. Besides, the lithium ion secondary cell of Example 2 is subject to relatively small deterioration with increase in the charging-discharging cycle, exhibiting an excellent cell performance.

Example 3

A lithium ion secondary cell was assembled in the same manner as in Example 2 and the charging-discharging cycle test was conducted under the same condition but under changing temperatures. The test temperatures were −20° C., 0° C., 60° C. and 80° C.

Comparative Example 3

A lithium ion secondary cell which was not formed with the fiber layers was assembled in the same manner as in Comparative Example 2 and the charging-discharging cycle test was conducted under the same conditions as in Example 3 but under changing temperatures.

Discharging capacity of Example 3 and Comparative Example 3 at the 1st, 50th and 300th cycles are shown in Table 3.

TABLE 3

| | | Discharging capacity (mAh/cm$^2$) | | |
|---|---|---|---|---|
| | Test temperature | 1st cycle | 50th cycle | 300th cycle |
| Example 3 | −20° C. | 2.7 | 3.3 | 1.7 |
| | 0° C. | 3.0 | 2.7 | 2.0 |
| | 60° C. | 3.4 | 3.2 | 2.8 |
| | 80° C. | 3.5 | 3.2 | 2.4 |
| Comparative Example 3 | −20° C. | 2.3 | 1.9 | 1.2 |
| | 0° C. | 2.5 | 2.1 | 1.5 |
| | 60° C. | 3.0 | 2.5 | 1.5 |
| | 80° C. | 3.2 | 2.3 | 1.2 |

As will be apparent from Table 3, the lithium ion secondary cell of Example 3 has a larger capacity than Comparative Example 3 which is not provided with the fiber layer over a wide temperature range from −20° C. to 80° C. Besides, the lithium ion secondary cell of Example 3 is subject to relatively small deterioration with increase in the charging-discharging cycle, exhibiting an excellent cell performance.

Example 4

A lithium ion secondary cell was assembled in the same manner as in Example 2 and the charging-discharging cycle test was conducted under the same conditions but by changing the rate of charging and discharging. The test was conducted with a charging-discharging current density of 3 mA/cm$_2$ which was three times as large as that of Example 2.

Comparative Example 4

A lithium ion secondary cell which was not formed with the fiber layers was assembled in the same manner as in Comparative Example 2 and the charging-discharging cycle test was conducted under the same conditions as in Example 3 but by changing the rate of charging and discharging.

Discharging capacity of Example 4 and Comparative Example 4 at the $1^{st}$, $50^{th}$ and $300^{th}$ cycles are shown in Table 4.

TABLE 4

| | Charging-discharging density(mA/cm$^2$) | Discharging capacity (mAh/cm$^2$) | | |
|---|---|---|---|---|
| | | $1^{st}$ cycle | $50^{th}$ cycle | $300^{th}$ cycle |
| Example 4 | 3 | 3.2 | 2.8 | 2.2 |
| Comparative Example 4 | 3 | 2.8 | 2.2 | 1.1 |

As will be apparent from Table 4, the lithium ion secondary cell of Example 4 has a larger capacity than Comparative Example 4 which is not provided with the fiber layer. Besides, the lithium ion secondary cell of Example 4 is subject to relatively small deterioration with increase in the charging-discharging cycle, exhibiting an excellent cell performance in rapid charging and discharging.

What is claimed is:

1. A lithium ion secondary cell comprising
   a positive electrode layer,
   a negative electrode layer,
   a solid electrolyte layer between the positive electrode layer and the negative electrode layer,
   and a carbon fiber layer provided in an interface between the solid electrolyte layer and the positive electrode layer, wherein the carbon fiber layer consists of carbon fibers having a diameter of 0.5 nm to 1000 nm and being made by a method selected from the group consisting of the arc method, the laser abrasion method and the gas phase growth method, and the positive electrode layer is disposed adjacent the carbon fiber layer without being in direct contact with the solid electrolyte layer.

2. A lithium ion secondary cell as defined in claim 1 wherein the carbon fiber layer is impregnated with an organic liquid.

3. A lithium ion secondary cell as defined in claim 1 wherein the solid electrolyte layer has a textured surface which is in contact with the carbon fiber layer.

4. A lithium ion secondary cell as defined in claim 1 wherein the solid electrolyte layer comprises lithium ion conductive crystal or glass.

5. A lithium ion secondary cell as defined in claim 4 wherein the solid electrolyte layer is made of glass-ceramic.

6. A lithium ion secondary cell as defined in claim 4 wherein the solid electrolyte layer is a composite electrolyte of a lithium ion conductive glass-ceramic and a polymer.

7. A lithium ion secondary cell as defined in claim 4 wherein the solid electrolyte layer has a thickness of 300 μm or below and ion conductivity at 25° C. of $10^{-5}$Scm$^{-1}$ or over.

* * * * *